(12) United States Patent
Hawkins et al.

(10) Patent No.: US 8,224,379 B2
(45) Date of Patent: Jul. 17, 2012

(54) INTEGRATED PERSONAL DIGITAL ASSISTANT DEVICE

(75) Inventors: Jeffrey C. Hawkins, Atherton, CA (US);
Thomas B. Bridgwater, San Francisco, CA (US); Robert Y. Haitani, Menlo Park, CA (US); William B. Rees, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 915 days.

(21) Appl. No.: 12/163,948

(22) Filed: Jun. 27, 2008

(65) Prior Publication Data

US 2008/0261652 A1    Oct. 23, 2008

Related U.S. Application Data

(63) Continuation of application No. 09/976,475, filed on Oct. 12, 2001, now Pat. No. 7,395,089.

(60) Provisional application No. 60/297,817, filed on Jun. 11, 2001.

(51) Int. Cl.
*H04M 1/00* (2006.01)

(52) U.S. Cl. .................................................. 455/556.1

(58) Field of Classification Search ............... 455/556.1, 455/556.2, 575.3, 557, 412.1
See application file for complete search history.

(56) References Cited

U.S. PATENT DOCUMENTS

| 4,797,912 A | 1/1989 | Hashimoto |
| 5,410,593 A | 4/1995 | Kamota |
| 5,633,912 A | 5/1997 | Tsoi |
| 5,870,492 A | 2/1999 | Shimizu et al. |
| 5,957,595 A | 9/1999 | Chen |
| 6,028,923 A | 2/2000 | Kolb et al. |
| 6,154,758 A | 11/2000 | Chiang |
| 6,487,602 B1 | 11/2002 | Thakker |
| 6,665,173 B2 | 12/2003 | Brandenberg et al. |
| 6,727,830 B2 | 4/2004 | Lui et al. |
| 6,741,235 B1 | 5/2004 | Goren |
| 6,774,927 B1 | 8/2004 | Cohen et al. |
| 6,836,759 B1 | 12/2004 | Williamson et al. |
| 7,048,456 B2 | 5/2006 | Keinonen et al. |
| 7,171,108 B1 | 1/2007 | Masters et al. |
| 7,231,229 B1 | 6/2007 | Hawkins et al. |
| 7,260,390 B1 | 8/2007 | Skinner et al. |
| 7,512,952 B1 | 3/2009 | Liu et al. |

OTHER PUBLICATIONS

Non-Final Office Action, U.S. Appl. No. 11/112,182, Apr. 1, 2009, 12 pages.

*Primary Examiner* — Sam Bhattacharya

(57) ABSTRACT

An integrated device provides functionality of both a PDA and cellular telephone. Features include a power button offering control of both the computing and telephony functions of the device; a lid that turns the device on and off and controls additional telephony functions; a jog rocker that activates the device and is used to select from a variety of menu options; application buttons that offer direct access to applications stored on the device, and which can be configured to operate in conjunction with secondary keys to offer added functionality; a keyboard that enables data input into the device; an automatic word completion function that verifies and corrects a user's typing in real time; and a simplified keyboard navigation system that allows the navigation of menus using keyboard shortcuts.

24 Claims, 8 Drawing Sheets

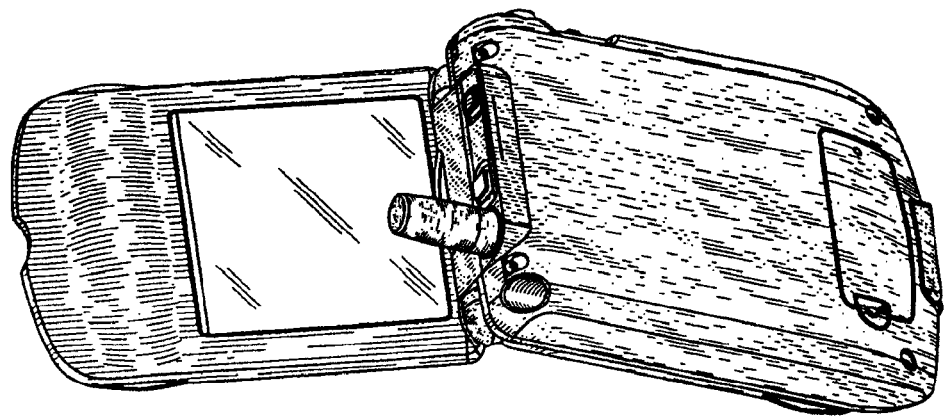
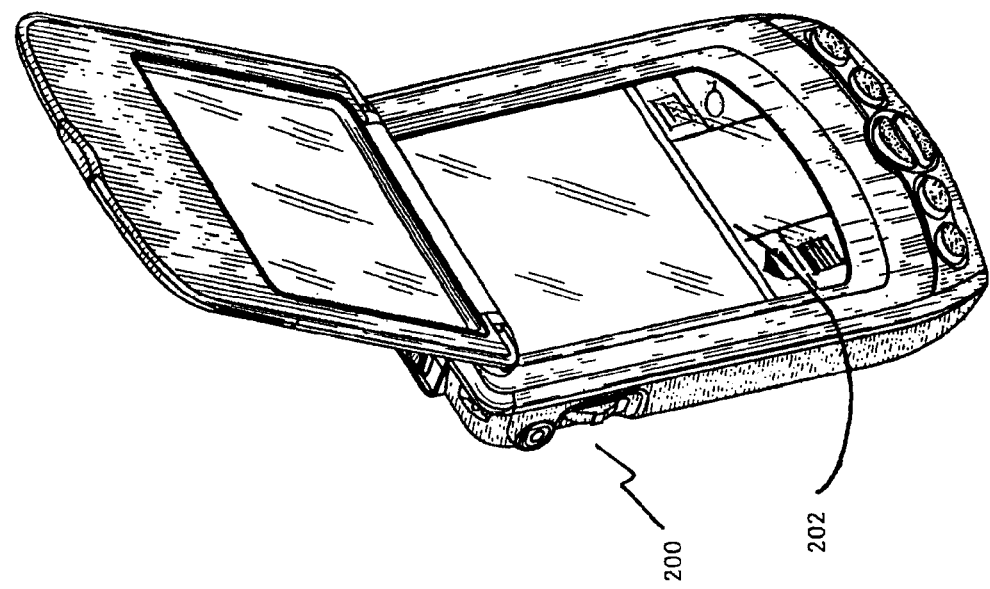
FIG 2

| Action | Device Power Off (include Active Headset Call) | Device Power On | | | | |
|---|---|---|---|---|---|---|
| | | Incoming Call | | Active Call | | Other |
| | | Within 1s of Notification | After 1s of Notification | No Headset | Headset | |
| Opening the Lid | Turns device on, Launches the app assigned to the lid | Nothing | Answers call | N/A | Nothing | Nothing |
| Closing the Lid | Nothing | Nothing | Silences ring, Ignores call, Turns device off | Displays 2-second hang up confirmation, Hangs up, Turns device off | Turns device off, Does not hang up | Turns device off |

Lid Matrix

FIG. 5

Legend

| Shifted Character | Option Character |
|---|---|
| Normal Character | |

Complete Keyboard Layout

| Q | W | @ | E | $ | R | / | T | * | Y | 1 | U | 2 | I | 3 | O | # | P | " |
|---|---|---|---|---|---|---|---|---|---|---|---|---|---|---|---|---|---|---|
| Cntrst | w | | e | | r | | t | | y | | u | | i | | o | | p | |
| A | S | ( | D | ) | F | − | G | + | H | 4 | J | 5 | K | 6 | L | ' | N/A | N/A |
| % | s | | d | | f | | g | | h | | j | | k | | l | | Backspace | |
| N/A | Z | : | X | ! | C | ? | V | , | B | 7 | N | 8 | M | 9 | . | , | N/A | N/A |
| Option | z | | x | | c | | v | | b | | n | | k | | m | | N/A | |
| Find | Shift | | N/A | | Tab | | Space | | | | ListType | | | | Launcher | | Menu/Command | |

FIG. 6a
Keyboard Layout of Device 100

Punctuation/Symbol/Number Layout

| Contrast | @ | $ | / | * | 1 | 2 | 3 | # | " |
|---|---|---|---|---|---|---|---|---|---|
| % | ( | ) | − | + | 4 | 5 | 6 | ' | Back |
| Opt | : | ! | ? | , | 7 | 8 | 9 | . | Return |
| Shift | | Space | | | | 0 | | | Menu/Command |

FIG. 6b
Punctuation/Symbol/Number Layout of Device 100

INTEGRATED PERSONAL DIGITAL ASSISTANT DEVICE

CROSS REFERENCE TO RELATED APPLICATION

This application is a continuation of U.S. patent application Ser. No. 09/976,475 filed on Oct. 12, 2001, which claims priority and benefit under 35 USC §119(e) to U.S. Provisional Application No. 60/297,817, filed Jun. 11, 2001, both of which are incorporated herein by reference in its entirety.

BACKGROUND

1. Field of the Invention

The present invention is related generally to a user interface for a personal digital assistant device.

2. Description of the Related Art

Carrying a personal digital assistant (PDA) around is very convenient for tasks such as taking notes at a meeting or lecture, scheduling appointments, looking up addresses, and for performing a whole host of other functions. However, one function not easily performed with a PDA is that of telecommunications. A typical cellular telephone, meanwhile, offers a range of features, from speed dial to speakerphone to caller-ID, phonebook, etc. In order to have the functionality of a cellular telephone and the functionality of a PDA, consumers have generally had to choose from a selection of largely unsatisfactory options. The most common option is to carry both a PDA and cell phone. This is undesirable, however, because of the obvious impractical aspects of having to deal with two separate devices, both in terms of sheer bulk as well as the inconvenience of switching between units. Simply put, there are more things to buy, more things to break, and more things to lose.

Another option is to purchase an add-on telephone device for a PDA. While this option is preferable to carrying two devices around, it still has limitations. For example, an add-on telephone device adds bulk to and changes the form factor of the PDA. In addition, since such a PDA must be designed to operate without an add-on telephone, the degree to which the user interface of the PDA can be integrated with the user interface of the add-on telephone is limited. Thus, an add-on solution is of only limited value, since there is not a true integration between the cellular telephone device and the PDA, but rather two separate devices at best co-existing side-by-side.

Accordingly, what is needed is a system and method for providing a user interface to a device featuring integrated functionality of both a PDA and cellular telephone.

SUMMARY

In accordance with the present invention there is provided a system and method for using an integrated device featuring functionality of both a PDA and cellular telephone. Features of the present invention include a power button offering control of both the computing and telephony functions of the device; a lid that turns the device on and off depending on its state, and can also be used to begin and terminate calls; a jog rocker that activates the device and is used to select from a variety of menu options; application buttons that offer direct access to applications stored on the device, and which can be configured to operate in conjunction with secondary keys to offer added functionality; an override-able ringer switch; a keyboard; and an Auto Word Completion function that verifies and corrects a user's typing in real time.

BRIEF DESCRIPTION OF THE DRAWINGS

FIG. 2 is an illustration of a device without keyboard in accordance with an embodiment of the present invention.

FIG. 5 is an illustration of a matrix describing behavior of a lid attached to a device in accordance with an embodiment of the present invention.

FIGS. 6a and 6b are illustrations of a keyboard layout in accordance with an embodiment of the present invention.

FIGS. 7a and 7b illustrates views of a display screen when Option mode and Option Lock mode are activate in accordance with an embodiment of the present invention.

DETAILED DESCRIPTION

In the discussion set forth below, for purposes of explanation, specific details are set forth in order to provide a thorough understanding of the invention. It will be appreciated by those skilled in the art that the present invention may be practiced without these specific details. In particular, those skilled in the art will appreciate that the methods described herein can be implemented in devices, systems and software other than the examples set forth. In other instances, conventional or otherwise well-known structures, devices, methods and techniques are referred to schematically or shown in block diagram form in order to facilitate description of the present invention.

The present invention includes steps that may be embodied in machine-executable software instructions, and includes method steps that are implemented as a result of one or more processors executing such instructions. In other embodiments, hardware elements may be employed in place of, or in combination with, software instructions to implement the present invention. The software instructions may be stored in RAM or ROM, or on other media including removable media.

Figure 1:
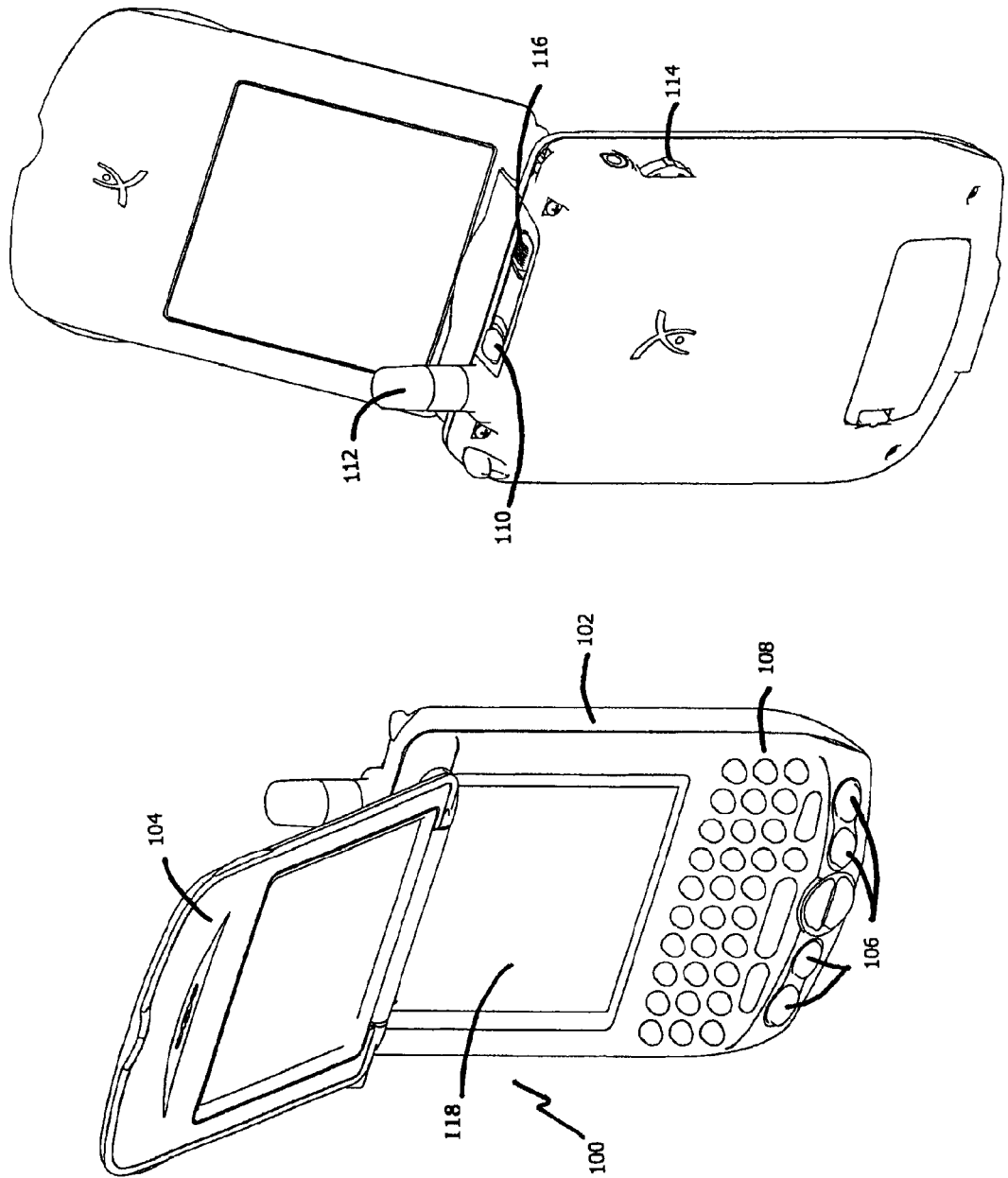
FIG. 1 is an illustration of a device with keyboard in accordance with an embodiment of the present invention.

The present invention includes a user interface for the operation of an integrated handheld personal computing device and wireless communication device. Referring now to FIG. 1, there is shown an example of such an integrated device 100. As illustrated in FIG. 1, device 100 includes a base section 102, a lid 104, application and scroll buttons 106, power button 110, antenna 112, jog rocker 114, and ringer switch 116, and display 118. In addition, device 100 includes a keyboard 108. As will be appreciated by those of skill in the art, the present invention may exist in a variety of embodiments, including embodiments in which the integrated device includes more or fewer physical components than are illustrated in FIG. 1. For example, FIG. 2 illustrates another device 200 that does not have a keyboard, but instead has a writeable area 202 enabling input to the device 200 via, for example, a stylus. For convenience and clarity, device 100 of FIG. 1 serves as the illustration that will be referenced throughout this specification, but such reference should in no way be understood to restrict what is disclosed to such an embodiment.

Device 100 includes an integrated GSM radio (also referred to as a cellular telephone), and while in alternative embodiments is of varying sizes and shapes, in one embodiment the device is designed to fit comfortably in a pocket. While the radio uses the GSM standard in one embodiment, in alternative embodiments the radio may use the CDMA standard, or any of a variety of other well-known wireless standards.

Power Button

Device 100 has a power button 110, located in one embodiment on the top face, next to the antenna 112. In one embodiment, the power button 110 performs the following functions:

- A single press and release of the power 110 button toggles device 100 on/off.
- Pressing and holding the power button 110 toggles the radio on/off.
- Double-tapping the power button 110 toggles a backlight on/off.
- Triple-tapping the power button 110 inverts the display 118 and insures that the backlight is on.
- A single press of the power button 110 when an incoming call is ringing silences the ring but does not turn off the device 100.

Figure 3:
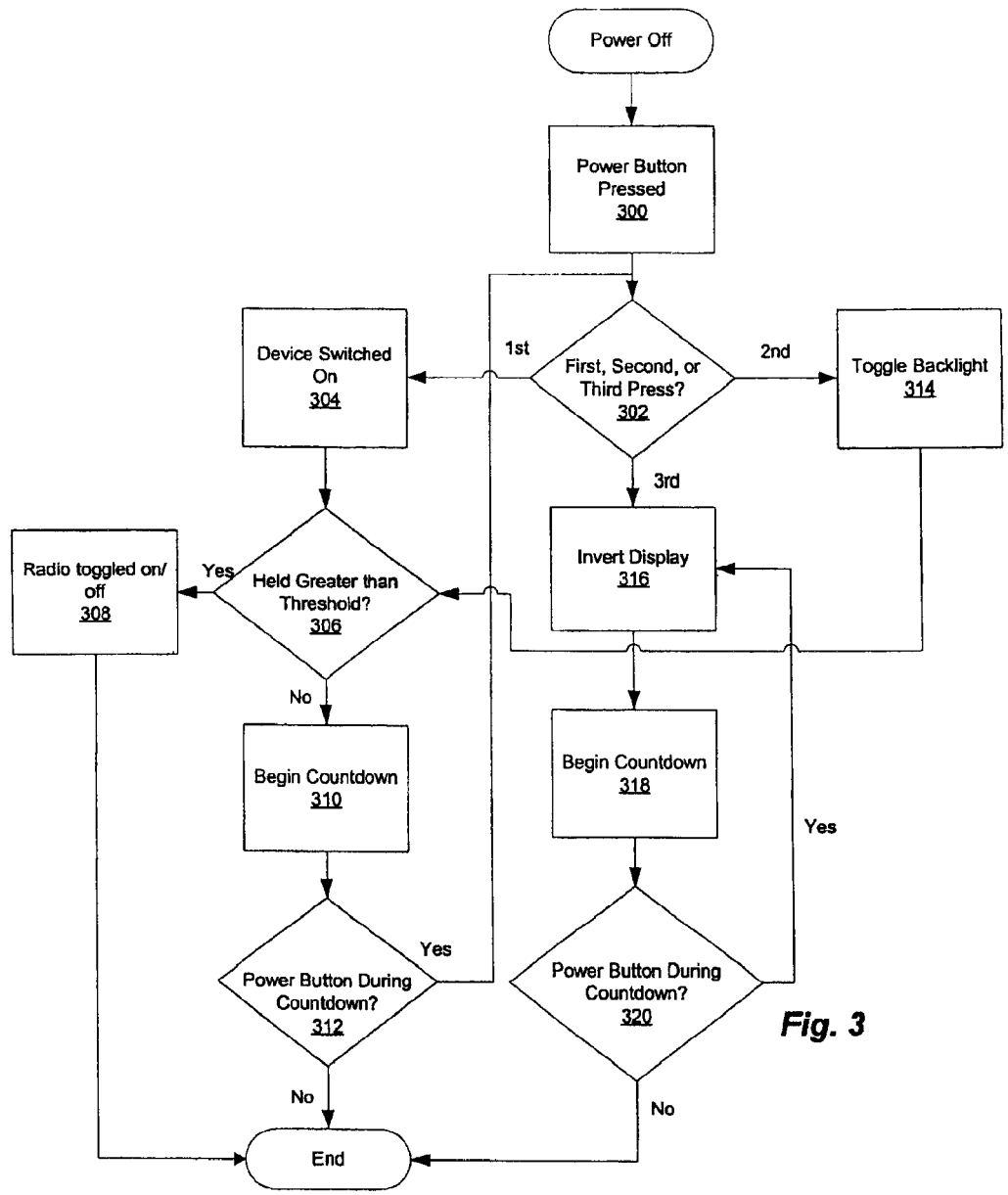
FIG. 3 is a flow chart illustrating power-on behavior of a device in accordance with an embodiment of the present invention.

Referring now to FIG. 3, there is shown a flowchart of the operation of the power button functionality starting from a device-off state. Initially, the device 100 is off and the power key is pressed 300. If the key is being pressed for the first time within a given period 302 (e.g., it has not been pressed for at least the previous half second), the device 100 is switched on 304. If the power button is held down for longer than a threshold amount of time, e.g., 1 second 306 then the radio is toggled on or off 308. If the power button is held down for less than the threshold amount 306, then upon release a countdown of predetermined length, e.g., ½ second, is begun 310. If the power button is pressed 312 during the countdown, then the backlight is toggled on or off 314. If the cycle is repeated and the power button is pressed for a third time during the countdown 312, then the display 118 is inverted 316, and the backlight is preferably turned on if it is not already on. If the power button is not pressed 312 during the countdown, then no additional actions take place as a result of the power button press. After the display is inverted in step 316, the countdown is once again begun 318. However, if the power button is pressed during this or subsequent countdowns 320, the display is again inverted at step 316. This countdown cycle continues until the power button is not pressed during the countdown 320.

Figure 4:
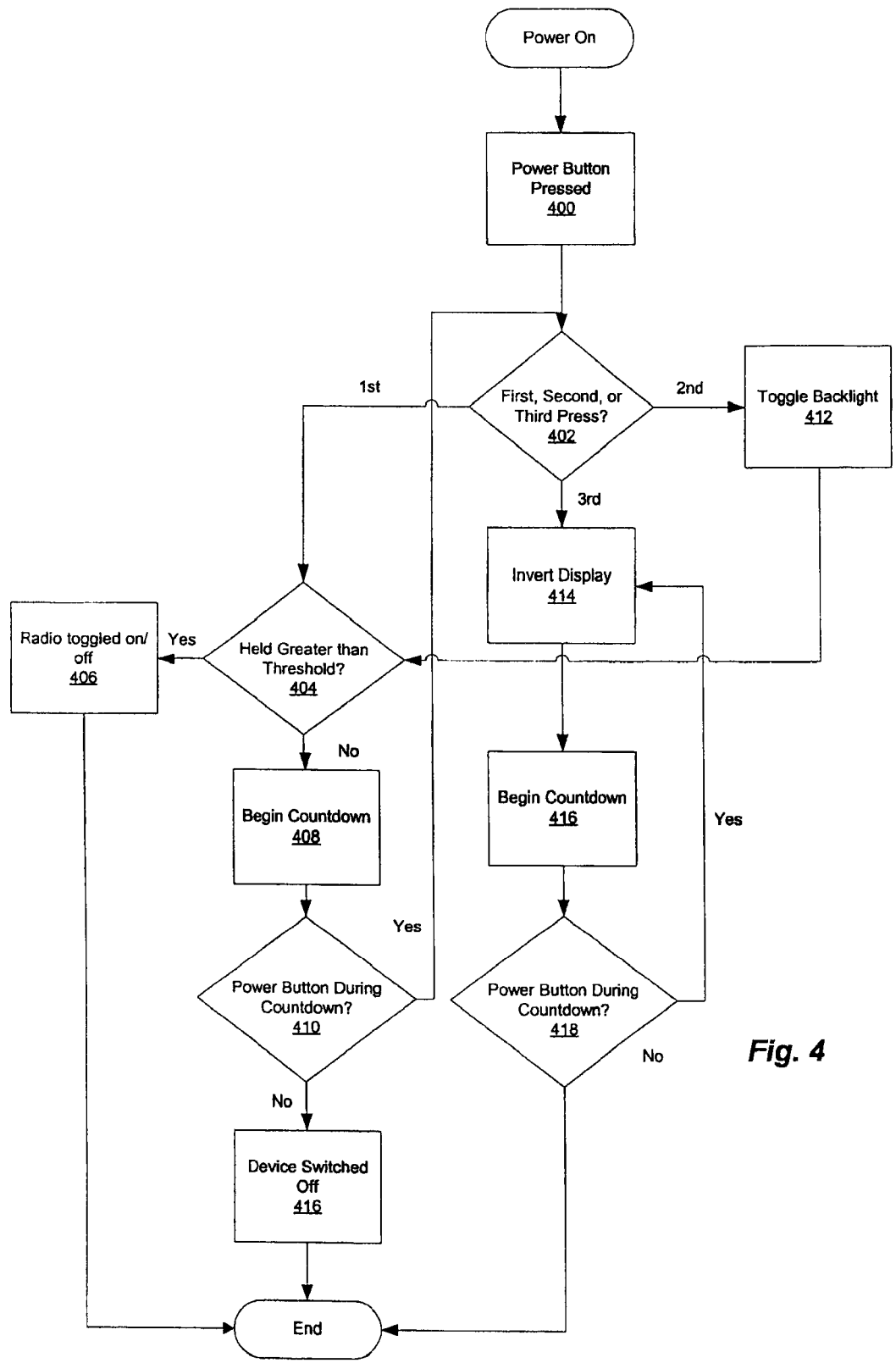
FIG. 4 is a flow chart illustrating power-off behavior of a device in accordance with an embodiment of the present invention.

Referring now to FIG. 4, there is shown a flowchart of the operation of the power button functionality starting from a device-on state. Initially, the device is on, and the power key is pressed 400. If the power key is being pressed for the first time 402 (e.g., it has not been pressed for at least the previous half second), no action is initially taken. If the power button is held down for longer than a threshold amount of time, e.g., 1 second 404 then the radio is toggled on or off 406. If the power button is held down for less than the threshold amount 404, then upon release a countdown of predetermined length, e.g., ½ second, is begun 408. If the power button is not pressed 410 during the countdown, then the device is turned off 416. If the power button is pressed 410 during the countdown, then the backlight is toggled on or off 412. If the cycle is repeated and the power button is pressed for a third time during the countdown, then the display is inverted 414, and the backlight is turned on if not already on. After the display is inverted 414, another countdown is begun 416. If the power button is pressed again 418 during the countdown, then the display is once again inverted 414, and countdown 416 restarted. This continues until the countdown expires without the power button being pressed 418.

In addition, in one embodiment pressing the power button 110 when there is an incoming call silences the ring or vibrate. Further, if a call is in progress, pressing the power button turns off the device 100 but does not terminate the call. Finally, if the device is off when a call comes in, the device is turned on, and the backlight is illuminated, which helps to locate the device 100, e.g., in a poorly-lit room.

Lid

Referring again to FIG. 1, there is shown a view of device 100, having a lid 104 attached to base 102. In FIG. 1, lid 104 is connected to base 102 via a hinge or other mechanism that allows lid 104 to open and close. Note that the lid 104 may be connected to base 102 in any of a variety of ways while still including features described herein. The particular embodiment of FIG. 1 is therefore meant to illustrate only one of many possible configurations.

In one embodiment, lid 104 features a hardware switch for lid open and lid close detection, and may additionally include an integrated speaker for flip phone-like functionality. When closed, in one embodiment, lid 104 covers all of base 102 except for application and scroll buttons 106. In one embodiment, lid 104 also includes a transparent window for viewing the display 118 of device 100 while the lid 104 is closed.

The effect of opening and closing the lid 104 varies according to the state of device 100 at the time the lid 104 is opened or closed. In one embodiment, and referring now to FIG. 5, opening and closing the lid 104 has the following effect:

If the device is off, opening the lid turns on the device 100, and launches 502 a predetermined application. In one embodiment, the predetermined application is a speed dial view of a telephone application, however in other embodiments the application can be any application on the device 100, assignable by the user in one embodiment via a preferences control panel-type application. If the device is off, closing the lid has no effect 504.

If the device is on, then it is in one of three states: either a call is in progress, a call is incoming, or there is no call activity.

Figure 8:
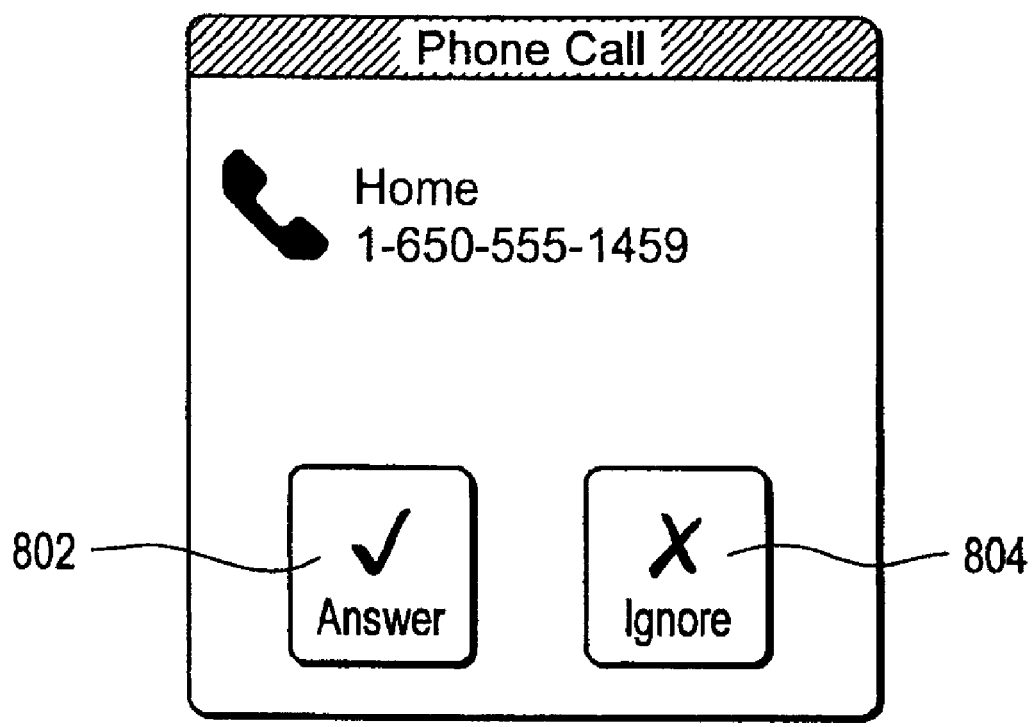
FIG. 8 is an illustration of a dialog box presented to a user when a call is incoming in accordance with one embodiment of the present invention.

If a call is incoming, then an incoming call notification is given to the user. An illustration of such a notification is shown in FIG. 8. It will be appreciated that a user may be in the process of opening the lid when a call comes in. In such a situation, the user may not want to actually take the incoming call. For that reason, if the lid is opened within, in one embodiment, one second of the incoming call notification, no action is taken 506 (although the user can still answer the call in other ways, e.g., by tapping a dialog box 802 on the display of device 100). In other embodiments, the time may be shorter or longer than one second. If the lid is opened more than one second after the initial incoming call notification, then the call is answered 508. Note also that in one embodiment a user can choose to accept or ignore any incoming telephone call by selecting the answer 802 or ignore 804 options presented in a popup dialog box.

Similarly, if the user is in the process of closing the lid when a call comes in, it is desirable to assume that the lid is being closed not in response to the incoming call, but rather by coincidence. Thus if the lid is closed within an initial time, e.g., one second, of the first notification of an incoming call, no action is taken 510. After this initial period, if the lid is closed, then in one embodiment the ring is silenced, the call is ignored, and the device is turned off 512.

During an active call, the lid is open in a preferred embodiment, unless a headset is plugged in. If a call is in progress and the headset is being used, then opening the lid has no effect on the call 514. If the lid is closed while a headset call is in progress, the device is turned off, but the call is not disconnected 516. If a telephone call is in progress without using a headset, then closing the lid hangs up the telephone, in one embodiment after displaying a warning message confirming that the call is about to be disconnected, and turns the device off 518. During the confirmation warning message, the user has the opportunity to tell the device not to disconnect the call, e.g. by pressing the scroll-up button. In alternative embodiments, the call is disconnected as soon as the lid is closed.

If a telephone call is not in progress, then in one embodiment, opening the lid when the device is already on has no effect 520. That is, even if there is an application assigned to be launched upon the opening of the lid, when the power is already on, opening the lid does not launch the assigned application, but rather has no effect on what application is currently executing. Also, in one embodiment, if a call is not in progress, closing the lid turns the device off 522.

In addition, in one embodiment keyboard 108 is deactivated when the lid 104 is closed, whether the device 100 is on or off. This guards against inadvertent input to the device when pressure is applied to the lid, e.g., if the device is carried in a pocket, or if something heavy is placed on top of the device. In alternative embodiments, the keyboard 108 remains active at all times regardless of lid position. In one embodiment, application and scroll buttons 106 remain active even when the lid 104 is closed. This allows the scroll buttons to be used to respond to dialog boxes that may be presented to the user when the lid is closed. For example, if an alarm goes off, the user can dismiss the alarm by pressing a scroll button, instead of having to open the lid to tap the display 118 or press a button on the keyboard 108.

Jog Rocker

Device 100 includes a jog rocker 114 such as is pictured in FIG. 1. A jog rocker in one embodiment allows four input actions: up, down, press in, and press and hold.

While individual applications provide specific responses to input from jog rocker 114, in one embodiment pressing the jog rocker 114 when device 100 is turned off wakes device 100 up and launches a predefined application, such as the phone application in one embodiment.

In one embodiment, this behavior is executed on jog rocker 114 press, not release, so that a press and hold of the jog rocker 114 wakes the device up, launches the predefined application on the press, and then executes within the application whatever that application has specified for a jog rocker 114 hold on the hold.

In another embodiment, jog rocker 114 can be used to provide a scroll-up and scroll-down function similar to that provided by scroll buttons 106. In one embodiment this is the default use for jog rocker 114 when an application does not provide additional functionality for the jog rocker.

Ringer Switch

Ringer switch 116 is used in a preferred embodiment to select whether incoming telephone calls should produce an audible ringing sound on device 100. In a first position, device 100 produces such a ring tone, which is customizable in one embodiment using application software stored on device 100. In a second position, device 100 does not produce a ring tone for an incoming call. In one embodiment, device 100 is configured to vibrate in response to an incoming telephone call. The vibrate feature of device 100 may additionally be activated by applications executing on device 100, for example even when ringer switch 116 is in the first position (the audible ring position).

In one embodiment, when ringer switch 116 is in the second position, all sounds made by device 100 are muted, and not just the ring tone. Thus, for example, while a number of applications executed on device 100, e.g., an alarm, a message alert, etc., may instruct device 100 to produce a sound, the location of the switch in the second position will stop device 100 from actually making the sounds. In yet another embodiment, device 100 allows software resident on device 100 to override the physical setting of ringer switch 116. This may be of particular use, for example, if the ringer switch is in the first position while a call is in progress and it is undesirable to have sounds from device 100 interfering with the call in an annoying fashion.

Application Buttons

A device such as device 100 typically has one or more application and scroll buttons 106 located physically on the device, providing direct access to applications associated with the buttons, as well as up-down and left-right scroll functionality. Using a keyboard 108 of device 100, different applications are assignable to the application buttons 106 being pressed in combination with a modifier key. In one embodiment, an "option" key is the modifier key for these key combinations.

In one embodiment, the following applications are mapped to option and ("+") application button combinations:

Option+Phone Application button maps to Memo Pad.
Option+Calendar Application button maps to To-Do.
Option+Internet Browser Application button maps to CityTime.
Option+Messaging Application button maps to the calculator.

In one embodiment, the Option+Application button key combination works both in series and in parallel. For example, pressing and releasing the Option button (a serial combination), then pressing an application button 106 launches the application that is mapped to that application button's option modification. Similarly, pressing and holding the Option button while pressing the application button 106 (a parallel combination) also launches that application button's option modification.

If the option modification times out before the application button 106 is pressed, then the functionality is the same as if only the application button had been pressed.

Pressing and holding Option, and then pressing an application button 106 while Option is still held down also launches the application that is mapped to that applications button's option modification. What occurs if the user continues to hold the application button in is controlled on an application-by-application basis.

In one embodiment, the following application buttons 106 and combinations are mappable:

a Phone Application button
a Calendar Application button
an Internet Browser Application button
a Messaging Application button In alternative embodiments, the following combinations are also mappable:

Option+Calendar Application button
Option+Phone Application button
Option+Internet Browser Application button
Option+Messaging Application button Keyboard In one embodiment, keyboard 108 includes the following keys:
- a-z (26 keys)
- . (period)
- Symbol key
- Space
- Return
- Backspace
- Shift key
- Option key
- Menu key FIG. 6a illustrates one embodiment of a keyboard 108 layout. In FIG. 6A, the bottom label of each key indicates its normal character, while the top left label indicates its shift key character, and the top right label indicates its option key character.

FIG. 6b illustrations just the number/punctuation keys extracted from FIG. 6a.

In an unmodified state, the keys produce the main character printed on them. In one embodiment, there is no on screen-modification state indicator for the unmodified keyboard state. In Shift state, the keys produce a capital version of the main character printed on them, as illustrated in FIG. 6a.

In Option state, the keys produce the alternate character illustrated in FIG. 6b.

In one embodiment, pressing the Option key once puts device 100 in Option state. Pressing Option in Option state puts the device in Option Lock state. Pressing Option in Option Lock state clears the state. Option state is canceled upon the entry of the Option-modified character. Option Lock state is not canceled upon the entry of the Option-modified character, hence the Lock-ness. Option state can be canceled without entering a character by pressing the Option key twice (once for lock, the second for clear) or pressing backspace. Note that in one embodiment, backspace cancels Option state, but not Option Lock state.

Figures 7A, 7B:
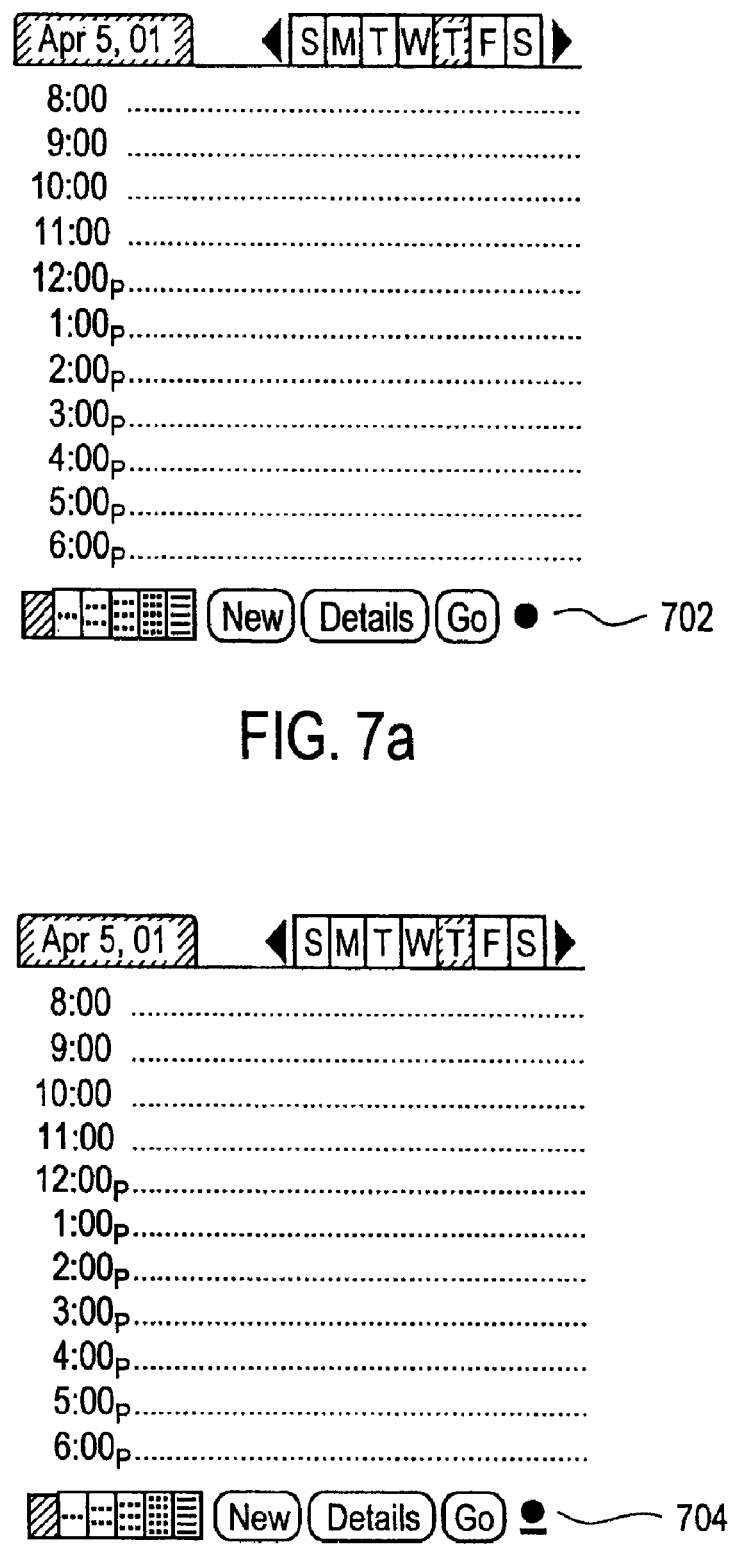

Referring now to FIG. 7a, in one embodiment, an on-screen modification state indicator 702 for Option state, which indicates to the user that the Option key has been pressed, is an oval tilted to have the same appearance as the shape of the Option key itself.

Referring now to FIG. 7b, the on-screen modification state indicator 704 for Option Lock state is similar to the Option state indicator except with a "bottom bar".

Holding down a key for a prolonged period causes the key to repeat. In one embodiment, all text entry has the same repeat rate, i.e. holding down the j produces j's at the same rate as holding down shift+j produces J's and option +j produces 5's. The Option and Shift keys both "time out" if additional input is not received within a prescribed period of time, e.g., 3 seconds in one embodiment. Note that in one embodiment the Option Lock and Shift Lock states do not time out.

In addition, in a preferred embodiment, when the currently executing application on device 100 changes from a first application to a second application, the Shift state is cleared to avoid unintended Shifted input into the second application.

Auto Word Completion

In order to provide a fast and easy way to enter awkward or often-misspelled text, device 100 includes a word auto-completion/correction system that in one embodiment checks every word that a user enters against a database of common misspellings and convenient abbreviations and replaces the entered word with a preset correct or complete version of the word. For example, if a user enters 'beleive', it will automatically be replaced with 'believe'. If a user enters 'im', it will be replaced with 'I'm'.

In one embodiment, Word Completion executes whenever a user enters any character that signals that they are finished typing the previous word, e.g.:
- Space
- Any punctuation
- Tab
- Return
- Next or Previous Field For instance, when a user types b,e,l,e,i,v,e the word 'beleive' is still displayed. If the user then enters a space (or any of the characters listed above) then 'beleive' is replace by 'believe'. Typing backspace once will erase the space (or tab, new line, etc.) that invoked the Word Completion. Typing backspace a second time will undo the word completion without deleting the last character of the word. At this point, typing any of the characters that usually invoke Word Completion will not invoke it again.

If the replacement word in the database is not capitalized, then the capitalization of the word to be replaced is maintained. For instance, there is an entry in the Word Completion database that has the wrong word "feild" marked to be replaced with "field" so:
- feild becomes field
- Feild become Field If the replacement word in the database is capitalized, then the resulting word is capitalized no matter what the capitalization of the word to be replaced was. For instance, there is an entry in the Word Completion database that has the wrong word "im" marked to be replaced with "I'm" so:
- im becomes I'm
- Im becomes I'm Keyboard Navigation and Commands In one embodiment, device 100 switches off or "sleeps" in order to conserve power after a predefined period of time. In such circumstance, pressing a key on the keyboard 108 wakes the device back up, i.e. restoring the device to a power on state in the same condition that it was in prior to going to sleep. In other embodiments, waking the device 100 up is equivalent to a power on command, which starts the device with a predefined initial application. Note that the keys which will wake the device up may be predetermined, or may be changeable by the user.

In one embodiment, some navigational activities of device 100 are keyboard enabled. Buttons such as "OK," "Done," and "Cancel" are mapped to certain keys and key combinations. Common actions, which may also be on-screen buttons like "New" and "Details . . . ," are frequently included as menu items. These menu items have menu button+letter combinations assigned to them so that they may be executed easily from the keyboard 108.

In one embodiment, menus on device 100 are navigable via a menu key and menu mode. Pressing and releasing a dedicated hardware menu key on keyboard 108 displays a first pull-down menu of the current view. Pressing and releasing the menu key a second time dismisses the menu.

While the menu is being displayed, in one embodiment the user can navigate the menus and execute menu items with the following actions:
- Scroll Up displays the next menu list to the right.
  - Scroll Up from the last menu list scrolls back to the first.
  - Holding Scroll Up repeats this action at the normal repeat rate.
- Scroll Down moves a highlight down through the current displayed list of menu items.

If there is no highlighted item, such as when the menu list is first displayed, then the first press of Scroll Down highlights the first menu item.

Scroll Down from the last menu item in the list scrolls back to the first item in the same list.

Holding Scroll Down repeats this action at the normal repeat rate.

Space executes the highlighted menu item on press.

Return also executes the highlighted menu item on press.

Backspace dismisses the menu.

At any time when any menu is displayed, pressing any of the short cut letters executes the corresponding menu item, even if that menu item is in a menu list that is not currently displayed.

Typing any character that is not detailed above or a short cut letter plays an error beep.

At any time, whether or not a menu is displayed, pressing and holding the menu key and pressing a one of the shortcut letters executes the corresponding menu item, in one embodiment, without the menu being drawn on the screen. Pressing and releasing the menu key and then pressing the shortcut letter will display the menu, however, in one embodiment.

Any menu that is being displayed is dismissed whenever a menu item is executed. Shift Lock and Option Lock are ignored when entering short cut letters. It is possible, however, to enter an option character as a short cut character in parallel:

User presses the menu button to enter menu mode

User presses and holds Option

User presses x for instance

The menu item with the short cut character ? would get executed, because the question mark (?) is formed by pressing Option-x.

Pressing and releasing Option and then pressing x would execute the menu item with the short cut letter x.

Menu mode itself will not clear the modification state, but the execution of a menu item may clear the modifications state depending on what that menu item does.

User starts in Option Lock

User presses the menu button

User presses the menu button again to dismiss the menu

The user should still be in Option Lock

Thus, when buttons containing certain text are on the screen, certain keys or key combinations can be pressed that will execute the buttons as if they were pressed on the screen.

The buttons that are mapped to the keyboard in one embodiment are:

OK
Done
Cancel
Yes
No
Next
Previous

The following four keys/key combinations are used for mapping to certain common on-screen buttons in one embodiment:

Return
Backspace
Option+Return
Option+Backspace
Option+Return and Option+Backspace will work only in parallel.

Globally, in one embodiment:

Option+Return executes:
OK
Done
Yes
Next
Send
Accept

Option+Backspace executes:
Cancel
No
Previous
Back
Reject

In one embodiment, if there is no opportunity for text entry on a particular screen, then the holding down of the Option key may be unnecessary. Thus, for example, within the context of alert dialogs:

Return executes:
OK
Done
Yes
Next
Send
Accept

Backspace executes:
Cancel
No
Previous
Back
Reject

Return and Backspace do not map to buttons in other contexts in one embodiment, since in other contexts there will likely be text areas in which Return and Backspace benefit from their normal functionality.

In addition, in one embodiment the mappings described above also apply to non-English based applications. For example, Option+Return is mapped to "Oui" in a French language application. This allows a user to execute a foreign-language application on device 100 while providing similar functionality to an English-language application.

The foregoing discloses exemplary methods and embodiments of the present invention. It will be understood that the invention may be embodied in other forms and variations without departing from the spirit or scope of the invention. Accordingly, this disclosure of the present invention is illustrative, but not limiting, of the invention, the scope of which is defined by the following claims.

We claim:

1. A method for operating a computing device, comprising:

activating the device and executing a first application stored in memory of the device responsive to the device being placed in a first physical state;

activating the device and executing a second application stored in the memory of the device responsive to a power button of the device being activated when the device is in a second physical state; and answering an incoming call responsive to the device receiving a notification of the incoming call and the device being placed in the first physical state more than a predetermined period of time after receiving the notification.

2. The method of claim 1, wherein the first physical state is an open state and the second physical state is a close state.

3. The method of claim 1, further comprising:
ignoring the incoming call responsive to the device being placed in the second physical state more than the predetermined period of time after receiving the second notification.

4. The method of claim 1, wherein executing the first application and the second application comprises executing a same application at separate instances.

5. The method of claim 1, wherein at least one of the first application and the second application comprises a telephone application or a communication application.

6. The method of claim 1, further comprising:
maintaining a first call connected responsive to the device being placed in the second physical state while the first call is in progress using the device and a headset; and
terminating a second call responsive to the device being placed in the second physical state while the second call is in progress using the device without the headset.

7. A device that comprises:
a first module configured to activate the device and execute a first application stored in memory of the device responsive to the device being placed in a first physical state;
a second module configured to activate the device and execute a second application stored in the memory of the device responsive to a power button of the device being activated when the device is in a second physical state; and
a third module configured to answer an incoming call responsive to receiving a notification of the incoming call and the device being placed in the first physical state more than a predetermined period of time after receiving the notification.

8. The device of claim 7, wherein the first physical state is an open state and the second physical state is a close state.

9. The device of claim 7, wherein the third module is further configured to ignore the incoming call responsive to the device being placed in the second physical state more than the predetermined period of time after receiving the notification.

10. The device of claim 7, wherein the first module and the second module are further configured to execute a same application at separate instances.

11. The device of claim 7, wherein at least one of the first application and the second application comprises a telephone application or a communication application.

12. The device of claim 7, wherein the third module is further configured to maintain a first call connected responsive to the device being placed in the second physical state while the first call is in progress using the device and a headset, and to terminate a second call responsive to the device being placed in the second physical state while the second call is in progress using the device without the headset.

13. A computer program product stored on a non-transitory computer readable medium for operating a device, the computer program product controlling a processor coupled to the medium to perform the operations of:
activating the device and executing a first application stored in memory of the device responsive to the device being placed in a first physical state;
activating the device and executing a second application stored in the memory of the device responsive to a power button of the device being activated when the device is in a second physical state; and
answering an incoming call responsive to the device receiving a notification of the incoming call and the device being placed in the first physical state more than a predetermined period of time after receiving the notification.

14. The computer program product of claim 13, wherein the first physical state is an open state and the second physical state is a close state.

15. The computer program product of claim 13, wherein the operations further comprises:
ignoring the incoming call responsive to the device being placed in the second physical state more than the predetermined period of time after receiving the second notification.

16. The computer program product of claim 13, wherein executing the first application and the second application comprises executing a same application at separate instances.

17. The computer program product of claim 13, wherein at least one of the first application and the second application comprises a telephone application or a communication application.

18. The computer program product of claim 13, wherein the operations further comprises:
maintaining a first call connected responsive to the device being placed in the second physical state while the first call is in progress using the device and a headset; and
terminating a second call responsive to the device being placed in the second physical state while the second call is in progress using the device without the headset.

19. A method for operating a communication device, comprising:
answering an incoming call responsive to receiving a notification of the incoming call and the device being in a first physical state for more than a predetermined period of time after receiving the notification; and
ignoring the incoming call responsive to the device being in a second physical state for more than the predetermined period of time after receiving the notification.

20. The method of claim 19, wherein the first physical state is an open state and the second physical state is a close state.

21. The method of claim 19, further comprising:
outputting a user notification for the incoming call responsive to receiving the notification of the incoming call and the device being placed in the first physical state no more than the predetermined period of time after receiving the notification;
receiving a user input responding to the user notification; and
answering or ignoring the incoming call based on the user input.

22. The method of claim 19, further comprising:
outputting a user notification for the incoming call responsive to receiving the notification of the incoming call and the device being placed in the second physical state no more than the predetermined period of time after receiving the notification;
receiving a user input responding to the user notification; and
answering or ignoring the incoming call based on the user input.

23. A device, comprising:
a first module configured to answer an incoming call responsive to receiving a notification of the incoming call and the device being in a first physical state for more than a predetermined period of time after receiving the notification; and a second module configured to ignore the incoming call responsive to the device being in a second physical state for more than the predetermined period of time after receiving the notification.

24. The device of claim 23, wherein the first physical state is an open state and the second physical state is a close state.

* * * * *